United States Patent Office 3,110,738
Patented Nov. 12, 1963

3,110,738
NITRATION OF AROMATIC COMPOUNDS
Louis Schmerling, Riverside, Ill., assignor to Universal Oil Products Company, Des Plaines, Ill., a corporation of Delaware
No Drawing. Filed Apr. 2, 1962, Ser. No. 184,503
18 Claims. (Cl. 260—645)

This invention relates to a novel method of preparation of nitroaromatic compounds.

Nitroaromatic compounds are in general valuable chemical intermediates in the production of various dyes and also in the production of inhibitors or antiozonants for rubber, gasoline, and the like. In many cases, products prepared from the para isomer of a substituted nitrobenzene possess superior qualities with respect to their intended application. For example, it is known that in particular N-phenyl-N'-cyclohexyl-p-phenylenediamine is an effective antiozonant for rubber. The preparation of this desirable compound is initially dependent upon the preparation of p-chloronitrobenzene—a product of the process of this invention—which, upon condensation with aniline followed by reductive alkylation with cyclohexanol, yields the desired N-phenyl-N'-cyclohexyl-p-phenylenediamine.

It is an object of this invention to present a novel method of nitrating aromatic compounds. It is a further object of this invention to present a novel method of nitrating a substituted benzene whereby the resulting nitro derivative is predominately a p-nitro derivative.

In one of its broad aspects the present invention embodies a method of preparing a nitroaromatic compound which comprises nitrating an aromatic compound in contact with a nitrating mixture comprising a Friedel-Crafts metal halide and an alkali metal nitrate at nitration reaction conditions.

A further embodiment of this invention is a method of preparing a nitrohalobenzene which comprises nitrating a halobenzene in contact with a nitrating mixture comprising a Friedel-Crafts metal halide and an alkali metal nitrate at nitration reaction conditions.

Another embodiment of this invention is in a method of preparing a nitroalkylbenzene which comprises nitrating an alkylbenzene in contact with a nitrating mixture comprising a Friedel-Crafts metal halide and an alkali metal nitrate at nitration reaction conditions.

Other objects and embodiments of this invention will become apparent in the following detailed specifications.

In accordance with the method of this invention an aromatic compound is nitrated in contact with a novel nitrating mixture. The novel nitrating mixture of this invention comprises a metal nitrate and a substantially anhydrous Friedel-Crafts metal halide including for example, aluminum chloride, aluminum bromide, ferric chloride, ferric bromide, etc. Other Friedel-Crafts metal halides which may be utilized, although not necessarily with the same or equivalent results, include zinc chloride, zirconium chloride, gallium chloride, titanium tetrachloride, antimonic chloride, antimonic bromide, bismuth chloride, and others well known to those skilled in the art. Although other metal nitrates are operable in conjunction with the aforesaid Friedel-Crafts metal halides, it is preferred to utilize the relatively inexpensive and readily available alkali metal nitrates. Suitable metal nitrates thus include sodium nitrate, potassium nitrate, lithium nitrate, rubidium nitrate, cesium nitrate, and in particular the first mentioned sodium nitrate.

The Friedel-Crafts metal halide and the selected metal nitrate are utilized in approximately stoichiometric amounts, although not necessarily present as such during the entire course of the nitration reaction. The aforesaid metal halide may be admixed with the aromatic compound to be nitrated for convenience in maintaining said metal halide in a substantially anhydrous state. The metal nitrate portion of the nitration mixture can be charged initially with the metal halide portion, although a preferred method is to add said metal nitrate to a stirred mixture of the metal halide and aromatic compound in a continuous or intermittent manner over a period of time which may be determined by the exothermic heat of reaction.

Nitration reaction conditions relate principally to temperature. Nitration may be effected in accordance with the present method at a temperature of from about 20° C. to about 120° C. or more, depending upon the particular aromatic compound to be nitrated. In any particular case the optimum nitration reaction conditions may be readily ascertained by one skilled in the art. For example, in the nitration of toluene, it was determined that the desired para isomer predominates at a reaction temperature of from about 25° C. to about 45° C.

The aromatic compounds which may be nitrated in accordance with the present method may comprise a benzene nucleus or condensed benzene nucleii. This invention finds particular application to the nitration of monosubstituted benzenes where the desired product is a para nitro derivative. Suitable monosubstituted benzenes include in particular alkyl benzenes such as toluene, ethylbenzene, cumene, n-propylbenzene, n-butylbenzene, t-butylbenzene, etc., and also halobenzenes such as chlorobenzene, bromobenzene, fluorobenzene, iodobenzene, etc. Other monosubstituted benzenes including phenol, aniline, and the like, may be nitrated by the present method although not necessarily with the same or equivalent results.

An excess of the aromatic compound over the amount to be nitrated is generally employed, principally for its diluting effect. The amount in excess is not critical to the method of this invention, nor is it detrimental in an economic sense since simple distillation methods are generally adequate to separate the excess from the reaction mixture for subsequent reuse.

One preferred embodiment of the method of this invention is in a method of preparing nitrotoluene which comprises nitrating toluene in contact with a nitrating mixture comprising aluminum chloride and sodium nitrate at nitration reaction conditions.

Another preferred embodiment is in a method of preparing chloronitrobenzene which comprises nitrating chlorobenzene in contact with a nitrating mixture comprising aluminum chloride and sodium nitrate at nitration reaction conditions.

Still another preferred embodiment of this invention is in a method of preparing nitrotoluene which comprises nitrating toluene in contact with a nitrating mixture comprising ferric chloride and sodium nitrate at nitration reaction conditions.

Another preferred embodiment of this invention is in a method of preparing chloronitrobenzene which comprises nitrating chlorobenzene in contact with a nitrating mixture comprising ferric chloride and sodium nitrate at nitration reaction conditions.

Still another preferred embodiment of this invention is in a method of preparing nitrobenzene which comprises nitrating benzene in contact with a nitrating mixture comprising aluminum chloride and sodium nitrate at nitration reaction conditions.

Aromatic compounds can be nitrated in accordance with the present method in any suitable or convenient manner. One manner of carrying out the nitration reaction comprises charging the metal halide to a reaction vessel containing therein the aromatic compound to be nitrated. Generally, any vessel equipped with a means of agitating the vessel contents is adequate as a reaction vessel. An open vessel with an overhead condenser is suitable. The metal nitrate can be added intermittently to the stirred vessel contents to maintain the reaction temperature within predetermined limits. The metal nitrate is added until said metal nitrate and metal halide are present in approximately stoichiometric amounts.

When the nitration has been completed the reaction mixture settles out in two immiscible liquid layers. The upper layer, consisting of the excess aromatic compound and part of the nitration product, and the lower layer, comprising the nitration product and containing any unreacted metal nitrate, can be water-washed in one operation. The water-washed reaction mixture is then extracted, as with pentane, dried and distilled. Alternatively the layers can be separated and worked up separately.

The following examples are presented to further illustrate specific embodiments of the method of this invention. Said examples are for the purpose of illustration only and are not intended as a limitation in any manner on the generally broad scope of this invention. The nitration reactions were carried out in a 3-necked alkylation flask equipped with a stirrer, an overhead water condenser, and a soda-lime tower to absorb hydrogen chloride evolved during the reaction.

*Example I*

Seventeen g. of sodium nitrate was added to a stirred mixture of 21 g. of anhydrous aluminum chloride in 150 g. of toluene over a 1.3 hour period. The temperature of the reaction ranged from about 25° C. to about 42° C. The reaction mixture was allowed to settle into two liquid layers on completion of the reaction. The upper layer was decanted, water washed and dried. Distillation yielded 124 ml. of toluene and 4 g. of bottoms. Infrared analysis of the bottoms indicated 48% toluene, 24% o-nitrotoluene, 3% m-nitrotoluene, and 21% p-nitrotoluene.

The lower layer, a dark brown mixture of salt and liquid, was treated with water, pentane extracted, dried and distilled. In addition to pentane, 13 ml. of toluene and 14.5 g. of bottoms was recovered. Infrared analysis indicated the bottoms to be 26% toluene, 28% o-nitrotoluene, 2% m-nitrotoluene, and 32% p-nitrotoluene. The ratio of p-:o-:m-isomers was 51:46:3 as compared to a 36:60:4 ratio resulting from the use of a nitric acid-sulfuric acid nitration mixture.

*Example II*

Fifteen g. of sodium nitrate was added to a stirred mixture of 32 g. of anhydrous ferric chloride in 150 g. of toluene over a 2.2 hour period. The temperature of the reaction ranged from about 50° C. to about 110° C. The reaction mixture was allowed to settle into two liquid layers on completion of the reaction. The upper layer was decanted, water-washed and dried. Distillation yielded 133 ml. of toluene and 9 g. of bottoms. Infrared analysis of the bottoms indicated 46% toluene, 22% o-nitrotoluene, 11% m-nitrotoluene, and 21% p-nitrotoluene.

The lower layer, a dark brown mixture of salt and liquid, was treated with water, pentane extracted, dried and distilled. In addition to pentane 3.5 ml. of toluene and 4 g. of bottoms was covered. Infrared analysis indicated the bottoms to be 30% toluene, 12% o-nitrotoluene, 8% m-nitrotoluene, and 12% p-nitrotoluene. The ratio of p-:o-:m-isomers was 40:40:20 as compared to a 36:60:4 ratio resulting from the use of a nitric acid-sulfuric acid nitration mixture.

*Example III*

Fifteen g. of sodium nitrate was added to a stirred mixture of 32 g. of anhydrous aluminum chloride and 200 g. of chlorobenzene over a 3.5 hour period. The temperature of the reaction ranged from about 63° C. to about 88° C. On completion of the reaction, the reaction mixture was water washed, pentane extracted and dried. The pentane extract was distilled to yield about 147 ml. of chlorobenzene and 26.5 g. of bottoms in addition to the pentane. Infrared analysis of the bottoms (which solidified on standing) indicated 12% chlorobenzene, 30% o-nitrochlorobenzene, 0.3% m-nitrochlorobenzene, and 45% p-nitrochlorobenzene for a p-:o-:m-ratio of 60:40:0.4.

*Example IV*

Approximately 0.2 mole of sodium nitrate is added to a stirred mixture of about 0.2 mole of anhydrous aluminum chloride and 1.6 moles of benzene. Upon completion of the nitration, indicated by a declining exothermic heater reaction, the reaction mixture is water washed and pentane extracted. The pentane extract is distilled and the desired nitrobenzene recovered therefrom.

I claim as my invention:

1. A method of preparing a nitroaromatic compound which comprises nitrating a nitratable aromatic compound in contact with a nitrating mixture comprising a Friedel-Crafts metal halide and an alkali metal nitrate at nitration reaction conditions.

2. A method of preparing a nitroaromatic compound which comprises nitrating a nitratable aromatic compound in contact with a nitrating mixture comprising aluminum chloride and an alkali metal nitrate at nitration reaction conditions.

3. A method of preparing a nitroaromatic compound which comprises nitrating a nitratable aromatic compound in contact with a nitrating mixture comprising aluminum chloride and sodium nitrate at nitration reaction conditions.

4. A method of preparing a nitrohalobenzene which comprises nitrating a mono-halobenzene in contact with a nitrating mixture comprising a Friedel-Crafts metal halide and an alkali metal nitrate at nitration reaction conditions.

5. A method of preparing a nitrohalobenzene which comprises nitrating a mono-halobenzene in contact with a nitrating mixture comprising aluminum chloride and an alkali metal nitrate at nitration reaction conditions.

6. A method of preparing a nitrohalobenzene which comprises nitrating a mono-halobenzene in contact with a nitrating mixture comprising aluminum chloride and sodium nitrate at nitration reaction conditions.

7. A method of preparing a nitroaromatic hydrocarbon which comprises nitrating a nitratable aromatic hydrocarbon in contact with a nitrating mixture comprising a Friedel-Crafts metal halide and an alkali metal nitrate at nitration reaction conditions.

8. A method of preparing a nitroaromatic hydrocarbon which comprises nitrating a nitratable aromatic hydrocarbon in contact with a nitrating mixture comprising aluminum chloride and an alkali metal nitrate at nitration reaction conditions.

9. A method of preparing a nitroaromatic hydrocarbon which comprises nitrating a nitratable aromatic hydrocarbon in contact with a nitrating mixture comprising aluminum chloride and sodium nitrate at nitration reaction conditions.

10. A method of preparing a nitroalkylbenzene which comprises nitrating a mono-alkylbenzene in contact with a nitrating mixture comprising a Friedel-Crafts metal halide and an alkali metal nitrate at nitration reaction conditions.

11. A method of preparing a nitroalkylbenzene which comprises nitrating a mono-alkylbenzene in contact with a nitrating mixture comprising aluminum chloride and an alkali metal nitrate at nitration reaction conditions.

12. A method of preparing a nitroalkylbenzene which comprises nitrating a mono-alkylbenzene in contact with a nitrating mixture comprising aluminum chloride and sodium nitrate at nitration conditions.

13. A method of preparing nitrotoluene which comprises nitrating toluene in contact with a nitrating mixture comprising aluminum chloride and sodium nitrate at nitration reaction conditions.

14. A method of preparing chloronitrobenzene which comprises nitrating chlorobenzene in contact with a nitrating mixture comprising aluminum chloride and sodium nitrate at nitration reaction conditions.

15. A method of preparing nitrotoluene which comprises nitrating toluene in contact with a nitrating mixture comprising ferric chloride and sodium nitrate at nitration reaction conditions.

16. A method of preparing chloronitrobenzene which comprises nitrating chlorobenzene in contact with a nitrating mixture comprising ferric chloride and sodium nitrate at nitration reaction conditions.

17. A method of preparing nitrobenzene which comprises nitrating benzene in contact with a nitrating mixture comprising aluminum chloride and sodium nitrate at nitration reaction conditions.

18. The method of claim 1 further characterized in that said aromatic compound is selected from the group consisting of benzene and mono-substituted benzenes in which the substituent is selected from the group consisting of alkyl, halogen, hydroxy and amino radicals.

References Cited in the file of this patent

Bacharach JACS, vol. 49 (1927), pp. 1522–1527.

Topchiev: "Nitration of Hydrocarbons and Other Organic Compounds" (1959), pub. by Pergamon Press, New York, pp. 81–83.